United States Patent [19]

Mersereau

[11] Patent Number: 4,809,340
[45] Date of Patent: Feb. 28, 1989

[54] OPTICAL CORRELATION SYSTEM

[75] Inventor: Keith O. Mersereau, Columbus, Ohio

[73] Assignee: Battelle Memorial Institute, Columbus, Ohio

[21] Appl. No.: 179,057

[22] Filed: Apr. 8, 1988

[51] Int. Cl.$^4$ ............................................. G06K 9/76
[52] U.S. Cl. .......................................... 382/1; 382/9; 382/31; 350/162.13; 209/584; 209/900
[58] Field of Search .................. 382/1, 9, 31; 350/162.13, 3.7, 3.82; 209/584, 900

[56] References Cited

U.S. PATENT DOCUMENTS

| | | | |
|---|---|---|---|
| 3,566,137 | 2/1971 | Lemmond | 382/31 |
| 3,604,778 | 9/1971 | Burckhardt | 350/3.82 |
| 3,873,181 | 3/1975 | Chivian et al. | 382/31 |
| 3,914,742 | 10/1975 | Munster et al. | 382/31 |
| 4,013,338 | 3/1977 | Sato et al. | 350/3.82 |
| 4,037,918 | 7/1977 | Kato | 350/3.82 |
| 4,094,011 | 6/1978 | Nagao | 350/3.82 |
| 4,735,486 | 4/1988 | Leib | 350/162.13 |

Primary Examiner—Leo H. Boudreau
Assistant Examiner—Donald J. Daley
Attorney, Agent, or Firm—Robert B. Watkins

[57] ABSTRACT

Invention provides optical correlation apparatus comprised of optical means producing a light image of the mailpiece including the address information, holographic filter means receiving the optical means light image and producing a filtered light image correlated to an address information reference pattern, detector means receiving the holographic filter means filtered light image and producing an output electronic signal which contains the degree of correlation of the mailpiece address information to the address information reference pattern, and signal processor means receiving the detector means output electronic signal and producing an address location signal based on a high degree of correlation of the mailpiece address information to the address information reference pattern.

19 Claims, 4 Drawing Sheets

OPTICAL CORRELATION SYSTEM

TECHNICAL FIELD

This invention relates generally to mail sorting, and particularly concerns an optical correlation system that utilizes pattern recognition techniques in the location of mailpiece address information.

BACKGROUND OF THE INVENTION

Automatic mail sorting apparatus has become quite specialized and sophisticated over recent years with much development attention being given to the processing of letter-sized mailpieces, including mailpieces with printed address information and/or codes positioned in prescribed locations on the mailpiece face. Larger mailpieces such as mail flats typically have their address information provided on the mailpiece face but not in a particular location or code form. Sometimes the address information is printed on labels affixed to the mailpiece; other times the address information is printed directly on the mailpiece face. Such address information is generally in a block form comprised of individual characters spaced in a line and character lines spaced in an array (or block), is typically oriented parallel or perpendicular to a mailpiece principal edge, and frequently is situated in a cluttered environment or background of other printed information. In the development of automatic mail sorting apparatus for mail flats, considerable attention must therefore be given to both the problem of identifying and locating address information as well as the problem of separating the address information from any background clutter.

Numerous prior art patents describe various correlation techniques, some directed to mail-sorting applications. None, as in the case of applicant's claimed invention, satisfactorily resolve the problem of efficiently locating address information positioned on the face of a mailpiece, particularly in a cluttered background. Such prior art patents include the following summarized examples.

U.S. Pat. No. 4,333,006 Gorin et al. discloses a multifocal holographic scanning system for reading bar codes. Each scanning beam is in overlapping relationship. U.S. Pat. No. 4,034,341 Isono et al. reveals an automatic postal-code number reading system including means to detect the position of the address and mail code.

U.S. Pat. No. 3,873,181 Chivian et al. relates to infrared correlation method using thermochromics having a hysteresis property. U.S. Pat. No. 3,818,191 Feenema et al. shows automatic non-contact recognition of coded insignia using fluorescent ink in a package sorting apparatus.

U.S. Pat. No. 3,684,867 Acker discloses a device and apparatus for machine reading of information having random position and/or random orientation when passing through or placed within a particular area. A video scanner detects differences in reflected light and orientation. U.S. Pat. No. 3,801,775 Acker reveals a method and apparatus for identifying objects. Fluorescent labels are read for orientation in perpendicular directories.

U.S. Pat. No. 3,566,137 Lemmond relates to a holographic character reader using a liquid photoconductor for recording input images radiated from the surface of an object characters. U.S. Pat. No. 3,432,032 Curphey et al. shows a presorting method and apparatus.

SUMMARY OF THE INVENTION

In order to locate mailpiece address information efficiently, I provide optical correlation apparatus comprised of optical means producing a light image of the mailpiece including the address information, holographic filter means receiving the optical means light image and producing a filtered light image correlated to an address information reference pattern, detector means receiving the holographic filter means filtered light image and producing an output electronic signal which contains the degree of correlation of the mailpiece address information to the address information reference pattern, and signal processor means receiving the detector means output electronic signal and producing an address location signal based on a high degree of correlation of the mailpiece address information to the address information reference pattern. The holographic filter means is recorded in film from an object transparency having window features set within a background, the window features being spaced from each other in lines of distances corresponding to the spacing of characters in lines in an address information reference pattern and being spaced from each other in lines in a block or array at distances corresponding to the spacing of character lines in a block in the address information reference pattern. From the standpoint of a particular system, I have discovered it advantageous that the address information reference pattern be based on the spacing of characters in a line at a distance in the range of approximately from 10 to 12 characters per inch and on the spacing of character lines in a block or array at a distance in the range of approximately 6 to 8 lines per inch.

The foregoing and other advantages of the invention will become apparent from the following disclosure in which preferred embodiments of the invention are described in detail and illustrated in the accompanying drawings. It is contemplated that variations in structural features and arrangement of parts may appear to the person skilled in the art, without departing from the scope or sacrificing any of the advantages of the invention.

DETAILED DESCRIPTION OF THE INVENTION AND BEST MODE FOR CARRYING OUT THE PREFERRED EMBODIMENT

Figure 1:
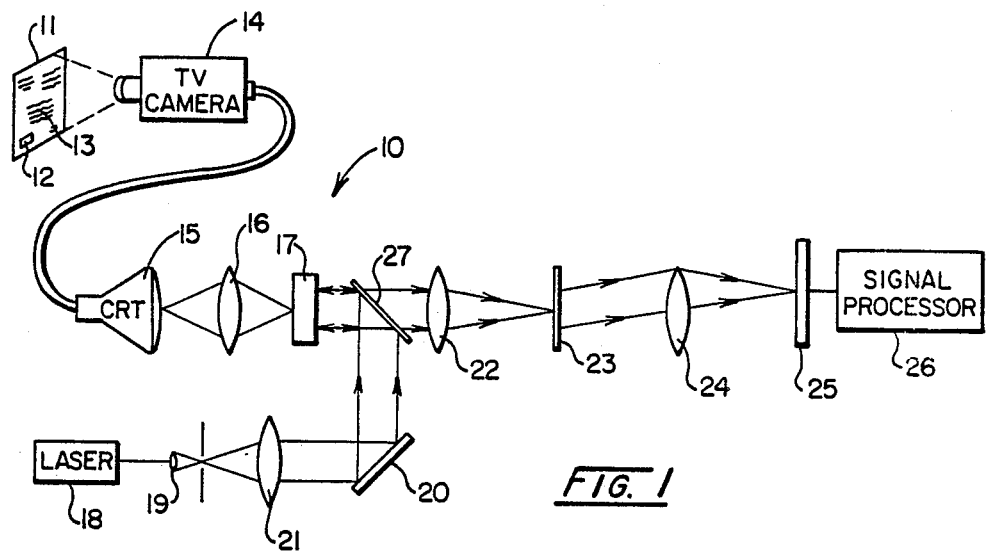
FIG. 1 is a schematic illustration of an optical correlation system in accordance with the present invention as applied to the processing of coherent light images.

FIG. 1 schematically illustrates an optical correlation system 10 which is utilized for locating address information in a mailpiece designated 11. The mailpiece 11 typically has an address block 12 that sometimes is situated in a cluttered background 13. Address block 12 is comprised of characters spaced in a line and character lines spaced in an array or block. Sometimes the address block may be in preprinted label form affixed to the mailpiece. In other instances the address information may be printed directly on the mailpiece face. In the case of a class of mailpieces known as mail flats the clutter background 13 is typically comprised of printed material directly printed on the face of mailpiece 11. Typically, address block 12 is positioned either parallel or perpendicular to a principle edge of the mailpiece 11.

I have discovered that at least in the United States the typical address blocks for which automatic sorting is required at this time have characters spaced in a line in a range of from 10 to 12 characters per inch. Similarly character lines are spaced in the block or array typically at a spacing in the range of from 6 to 8 lines per inch. These particular values are important in designing a useful system since the particular spacing of characters and lines is used as an address information reference pattern for operation of the optical correlation system 10.

System 10 includes a conventional television or solid state camera which is cooperably connected through appropriate electronic circuits to a cathode ray tube (CRT) 15. Camera 14 views and scans the field which includes mailpiece 11 and provides a light image in conventional video format at the face of cathode ray tube 15. Typically some digital or analog electronic preprocessing may be performed on the video image before presentation in cathode ray tube 15. This may include contrast reversal so that bright address characters will appear on a dark background. The image at the face of cathode ray tube 15 is radiated to projection lens 16 and afterwards is projected onto the sensitive face of a liquid crystal light valve 17. Valve 17 as manufactured by Hughes Aircraft Corporation, Industrial Products Division, Model Number H-4060, is a particular form of spatial light modulator.

The image projected by lens 16 onto the rear input face of light valve 17 is converted into an electric field distribution inside light valve 17. The linearly polarized coherent light emitted from laser means 18 is expanded using expansion lens 19 and collimating lens 21. Mirror 20 then reflects the light through polarizing beamsplitter 27. The linear polarization of the coherent light reflecting from mirror 20 has its direction of polarization arranged so that nearly all of the light is reflected by beamsplitter 27 toward the front reflective face of light valve 17. Light valve 17 selectively rotates the polarization of light reflected from its front reflective surface. The electric field at each point on the light valve 17 surface determines the degree of polarization rotation, if any, for light striking that surface. Therefore the intensity pattern on the rear input face of the light valve is converted to a polarization pattern. As the light reflected from the front surface of the light valve reaches polarizing beamsplitter 27, some light passes directly through the beamsplitter and some is reflected, depending on the direction of polarization of each point along the light field. The light passing through beamsplitter 27 therefore converts the polarization pattern into an amplitude pattern in coherent, linearly polarized light. This coherent light is transmitted through lens 22 and reaches holographic filter means 23, where it forms a Fourier transform of the amplitude pattern produced by the light valve 17 and beamsplitter 27 combination. The light amplitude passing through filter means 23 is multiplied by the pattern recorded on the holographic filter by the hereinafter described process of manufacturing a holographic filter means. The coherent light amplitude passed through filter means 23 travels to fourier transform lens 24 and then is transferred onto the face of detector array means 25. Detector array means 25 has a photo-sensitive face which is in the correlation or image plane of the optical correlation system and produces an output electronic signal equal to the squared modulus (intensity) of the mailpiece image amplitude correlated with the address information reference pattern incorporated into filter means 23.

The output electronic signal of detector array means 25 is transmitted to signal processor 26 which may be composed of analog or digital electronic algorithms and architectures and which develops coordinate address location information from the high degree of correlation, if present, detected at detector array means 25. Such coordinate location information is useful in controlling the operation of adjunct mail sorting equipment such as optical character readers.

Figure 2:
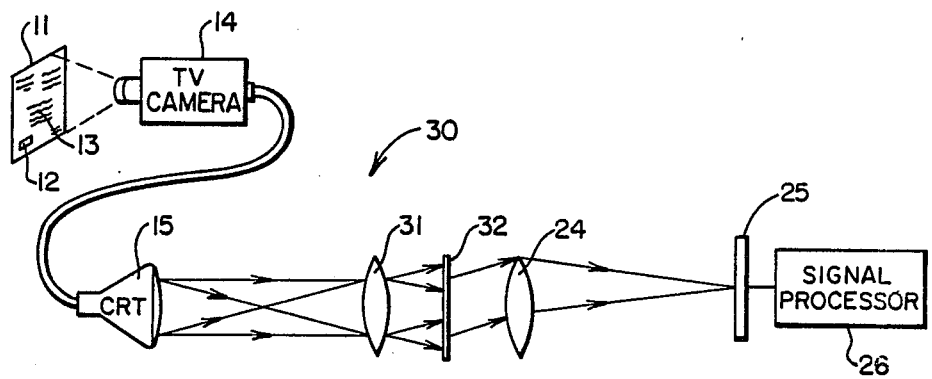
FIG. 2 is a schematic illustration of the optical correlation system of a present invention as applied to the processing of incoherent light images.

FIG. 2 illustrates another embodiment of the optical correlation system of this invention. The additional system is designated 30 in FIG. 2. The principle difference between systems 10 and 30 lies in the nature of the light image which is processed through the system. System 10 processes a coherent light image onto holographic filter means 23. In the FIG. 2 arrangement, however, system 30 transmits the narrow spectrum or narrow bandwidth incoherent light image from the face of cathode ray tube 15 to Fourier transform lens 31 and collimates that incoherent light image onto incoherent holographic filter means 32. Filter means 32 is constructed in a different manner than filter means 23 as will be hereinafter described. The filtered image from filter means 32 is transmitted to Fourier transform lens 24, and from lens 24, is focused onto the sensitive surface of detector array means 25. The output signal from electronic detector means 25 is transmitted to electronic signal processor 26 which develops coordinate address location information if there is correlation between the address block 12 of mailpiece 11 and the address information reference pattern which is incorporated into holographic filter means 32.

Figure 3:
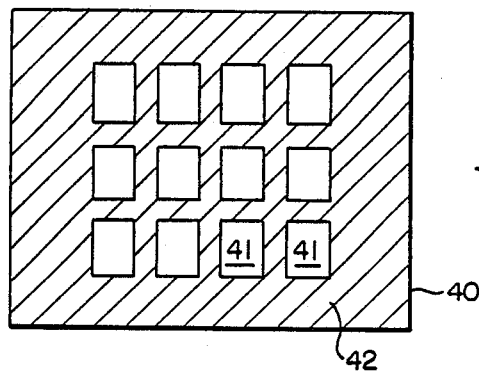
FIG. 3 is a schematic illustration of an object transparency utilized in the production of the holographic filter means incorporated in the apparatus of FIG. 1.
Figure 4:
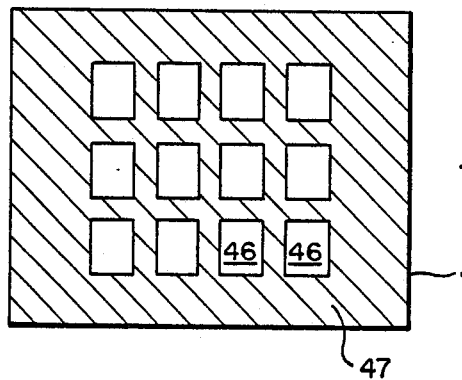
FIG. 4 is a schematic illustration of an object transparency utilized in the production of the holographic filter means incorporated in the apparatus of FIG. 2.

FIGS. 3 and 4 schematically illustrate two different object transparencies for use in constructing the holographic spatial filter means employed in the present invention. The object transparency designated 40 in FIG. 3 is utilized for manufacturing or producing holographic filter means 23. It is characterized as having windows 41 set within a background designated 42. Windows 41 have a wavefront amplitude of +1 and the background 42 has a wavefront amplitude of −1. In terms of light wavefront considerations, the windows designated 41 produce a wavefront, after transmission, which is delayed and 180° out of phase with respect to the wavefront transmitted through background 42.

The object transparency 45 of FIG. 4 is utilized to develop Vander Lugt filter means 32 in FIG. 2. Object transparency 45 includes windows 46 which are set within the background designated 47. In the FIG. 4 embodiment the windows have a wavefront amplitude of +1 and the background amplitude is designated as zero. In terms of the production of a Vander Lugt-type holographic filter means, for incoherent light image applications, object transparency 45 has transparent windows 46 which are set within an opaque background 47. This choice of window and background amplitudes presumes that the original mailpiece image has been contrast-reversed prior to display on cathode ray tube 15. Such a contrast-reversed image would typically contain bright address characters (from black ink) on a dark background (from white paper). If such reversal has not been performed, the window and the background amplitudes should be chosen as the reverse from the one stated above.

A key difference between systems 10 and 30 is that system 10 correlates amplitude functions, which may be positive- or negative-valued (bipolar). An incoherent system like 30 correlates intensity functions (images) which must be non-negative. A bipolar response is created for system 10 with a holographic filter 23 made from an object transparency 40.

Figure 8:
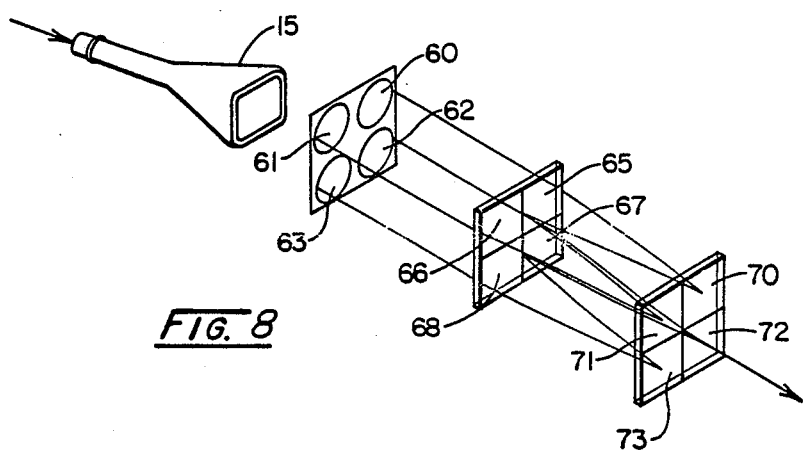
FIG. 8 is a schematic perspective view of a multichannel incoherent light optical correlation system constructed in accordance with the present invention.

A bipolar system response (the system response or, in technical jargon, "impulse response," is the function which is correlated with the mailpiece image) may be obtained while using only incoherent correlations, if a multichannel system such as that illustrated in FIG. 8 is implemented. To obtain a bipolar response, at least two channels would be used, each containing different impulse responses. The results would then be combined arithmetically (i.e., you might multiply one by a constant, then add or subtract the two). The combination of these might be accomplished optically, digitally, or through analog electronics. It is usually advantageous to arrange a system impulse response which integrates to near zero in a case like the present application.

Figure 9:
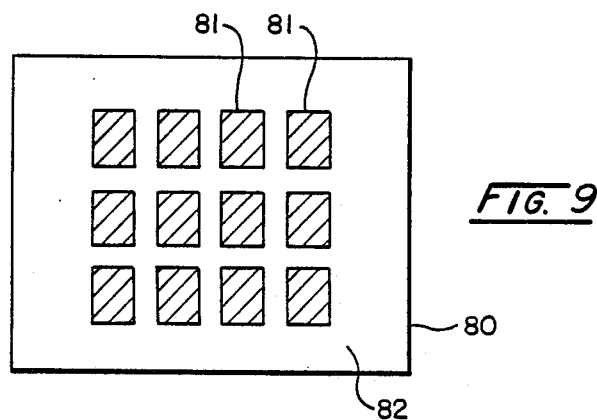
FIG. 9 is an alternate form of object transparency useful in preparing a holographic filter for an optical correlation system developing a bipolar impulse response.

One way to obtain a useful bipolar impulse response in this case would be to make two filters (for a two-channel system) in which one filter was made from object transparency 45, and the other from object transparency 80 (FIG. 9). The two objects are identical in dimensions, but object transparency 80 has opaque windows 81 on a transparent background 82, rather than the reverse. The two correlations are detected separately, then subtracted. The resulting overall system impulse response would then be the difference between the two individual impulse responses, which is a bipolar function.

Implementations of incoherent correlators with bipolar responses are described in the following publications:

A. W. Lohmann and W. T. Rhodes, "Two-pupil synthesis of optical transfer functions," Applied Optics, Vol. 17, p. 1141-1151 (1978). J. N. Mait and W. T. Rhodes, "Two-pupil synthesis of optical transfer functions: 2. Pupil function relationships, "*Applied Optics,* Vol. 25, p. 2003-2007.

I. Glaser, "Representing bipolar and complex imagery in noncoherent optical image processing systems: comparison of approaches, " *Optical Engineering,* Vol. 20, p. 568-573 (1981).

I. Glaser, "Holographic incoherent optical transfer function synthesis: analysis and optimization, " *J. Opt. Soc. Am. A,* Vol. 3, p. 681-693 (1986).

In both the FIG. 3 and FIG. 4 arrangements, the object transparency has windows arranged within their backgrounds in a particular manner. While the size, shape, or exact number or pattern of the individual windows is not important, the spacing of the windows in lines and the spacing of lines of windows in the transparency is critical. The windows are spaced in lines at a uniform distance which corresponds to the spacing of characters in lines for the address information reference pattern used for correlation purposes. As previously indicated such spacing is typically in the range of 10 to 12 characters per inch at least in terms of United States mailpiece mail flats. The spacing of lines or rows of windows in transparencies 40 and 45 is also critical. The line spacing of 40 and 45 is typically correlated to a line spacing in the range of 6 to 8 lines per inch in the address information reference pattern utilized for address identification purposes. I have discovered that as few as 4 character windows per line are sufficient for adequate mail address information location.

Figure 5:
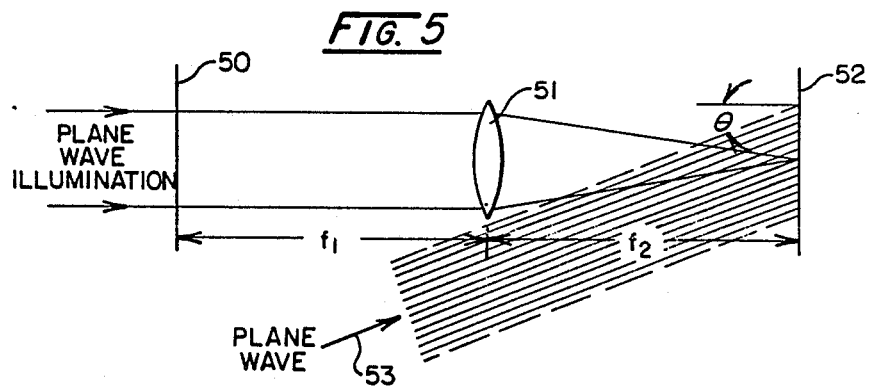
FIG. 5 is a schematic illustration of an accepted manner of producing a Vander Lugt holographic filter means utilizing an object transparency.

FIG. 5 is a schematic illustration of the method of making a Vander Lugt holographic filter. More detailed information regarding Vander Lugt filters may be found in the following references: A. B. Vander Lugt, "Signal Detection by Complex Spatial Filtering," Radar Lab., Report No. 4594–22-T, Institute of Science and Technology, The University of Michigan, Ann Arbor, 1963; R. C. Sherman, D. R. Grieser, F. T. Gamble, C. M. Verber, and T. Dolash, "Hybrid Incoherent Optical Pattern Recognition System," Appl. Opt. 22, 3579 (1984); and K. Mersereau, D. R. Grieser, N. F. Hartman, and F. T. Gamble, "Optical Techniques for Address Block Location and Recognition," United States Postal Service Advanced Technology Conference Proceedings, 397–426 (1986).

Basically the object transparency (40 or 45) is situated at object plane 50 and coherent plane wave illumination as from a laser source is transmitted through the object transparency 40 to transform lens 51. The image received by lens 51 is focused onto photographic film located at or in image plane 52. Simultaneously, a reference coherent plane wave beam is transmitted along path 53 at an incident angle of theta ($\theta$) onto the photographic film at image plane 52. The coherent plane wave illumination transmitted through object transparency 40 and lens 51, in combination with the reference wavefront transmitted along path 53, produces interference in the film at plane 52 and forms the desired holographic filter means 23. In the case of holographic filter means 2 for the processing of incoherent light images, the object transparency 45 is also located at plane 50. However, in the case of the production of the holographic filter means 32 for incoherent light images it is necessary to provide a ground glass diffuser in combination with object transparency 45.

For several practical reasons, the system configuration of FIG. 2 may be preferred over the system configuration of FIG. 1. Among the reasons are speed of mailpiece processing, ease of alignment, insensitivity to vibration, image resolution, compactness, and cost. However, signal-to-noise ratio considerations may justify further attention to the FIG. 1 configuration.

Figure 6:
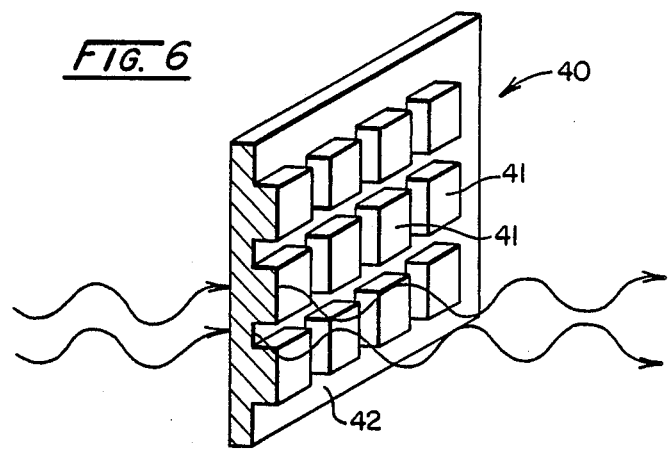
FIG. 6 is a perspective cross-sectional schematic illustration of the object transparency of FIG. 3.

FIG. 6 schematically and cross-sectionally illustrates one form of object transparency 40 for use in connection with the present invention. As shown in that illustration, a transparent glass is the background base for the object transparency. Superimposed on the base, as by a vacuum deposition process of glass using appropriate photo-resist mats, are the windows 41 which are of an additional thickness. As shown in the drawing, the wavefront light notation passing from the face of transparency 40 through background thickness is of a first waveform whereas the coherent light which passes through the background 42 and additionally through the superimposed thicknesses of the windows 41 is delayed by a half wavelength so as to be 180° out of phase with respect to the light passed through the background.

Figure 7:
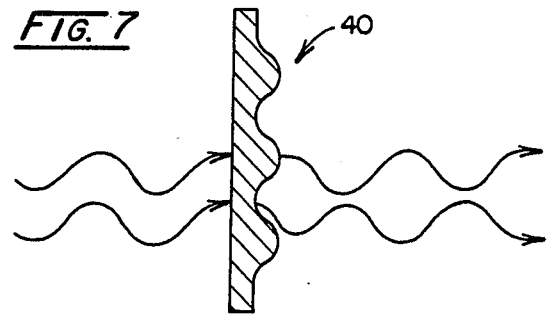
FIG. 7 is a sectional schematic view of another form of object transparency similar to the object transparency section of FIG. 6.

FIG. 7 is similar to FIG. 6 but is a cross-sectional view of another form of object transparency 40 in which the superimposed windows are constructed in sinusoidal thickness form to provide a continuous waveform phase shift between background and window locations. As in the case of the FIG. 6 illustration, the added thickness nodules which represent the windows have the same correlated spacing in lines and in lines of windows as the address information reference pattern.

It is also believed possible to construct the equivalent of object transparency 40 by other manufacturing methods than the vacuum deposition of an additional glass thickness. A computer-generated holographic filter could be made. Also, use of magneto-optical devices for introducing phase shift modifications into laser beam outputs might be considered.

FIG. 8 schematically illustrates a multichannel system which may be useful in the practice of the present invention. Although the FIG. 8 schematic is appropriate as a correlator using incoherent light, similar techniques may be used in constructing a coherent multichannel correlator. In the FIG. 8 arrangement the cathode ray tube 15 image is projected onto an array of Fourier transform lenses 60 through 63 and in turn is transmitted to a corresponding array of holographic filter means 65 through 68, each different, and each containing holographically the more usual final lens of the system. The filtered images of array 65 through 68 are transmitted to the corresponding detector arrays designated 70 through 73. In the proposed scheme different combinations of elements would be arranged to analyze address information blocks using different address information reference patterns. For instance, the sub-system comprised of elements 60, 65, and 70 could be used to identify a 10 characters per inch, 6 lines per inch address information pattern spacing perpendicular to the mailpiece principal edge, whereas combination 61, 66, and 70 could be utilized for the same address information spacing but in a parallel direction. Element combination 62, 67, and 72 might be utilized for a 12 characters per inch and 8 lines per inch spacing for the address information reference pattern in a perpendicular direction, whereas the combination of lens 63, filter 68, and detector 73 could be used for the same reference pattern spacing oriented parallel to the mailpiece principal edge. In the FIG. 8 arrangement it is obvious that the critical element of each sub-system is the use of a different Vander Lugt holographic filter means with appropriate address information reference pattern as developed through different window and line spacings in the object transparency.

Figure 10:
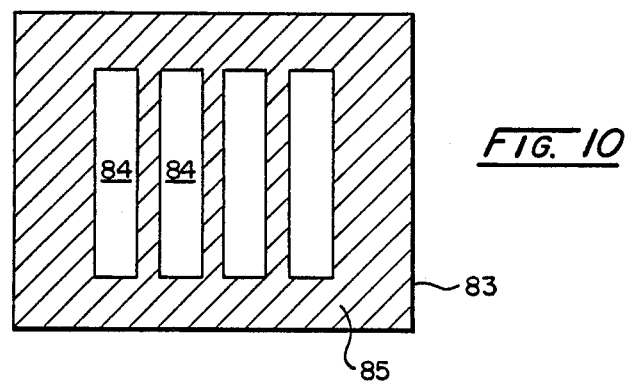
FIG. 10 is still another form of object transparency but useful in preparing a holographic filter which correlates address information on the basis of only character spacing rather than on a combination of character spacing and character line spacing.

Two additional filter designs may also be desirable. In these, the address character spacing or line spacing, rather than the combination of both, would be the key correlation feature. FIG. 10 illustrates an object transparency 83 in which window features 84 are spaced in a line at a spacing which corresponds to the address information reference pattern character spacing only. The exact number, form, and dimensions of the windows are not fixed, but the spacing is critical and should correspond to the mailpiece address character reference spacing. In the case of system 10, the window features would be of amplitude $+1$, and the background $-1$ (or the reverse), using the same techniques as might be used to form object transparency 40. The holographic filter 23 would then be made from the transparency in the usual way.

Figure 11:
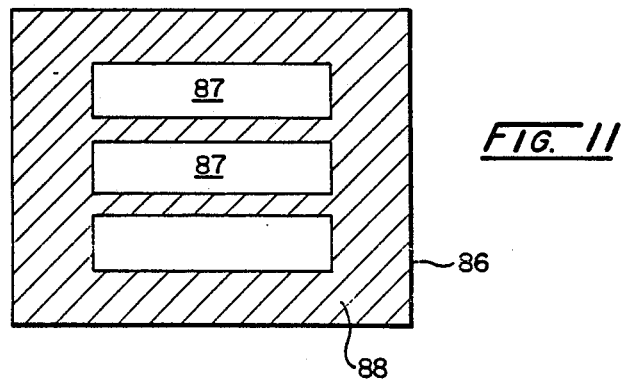
FIG. 11 is a further form of object transparency but useful in preparing a holographic filter which correlates address information on the basis of only character line spacing rather than on a combination of character spacing and character line spacing.

In the case of incoherent system 30, the window features would be relatively transparent (amplitude 1) and the background opaque (amplitude 0). A bipolar impulse response for system 30 could be obtained as before using a multichannel system with subtraction of two (or more) different correlations by designing non-negative responses which, when arithmetically combined, yield the proper bipolar impulse response. FIG. 11 illustrates an object transparency 86 similar to the one shown in FIG. 10 except that character line spacing only, and not character spacing, is the key correlation feature.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

I claim:

1. Apparatus for use in a mail sorting system, comprising:
   a. optical of a mailpiece having address information comprised of characters spaced in a line and character lines spaced in a block;
   b. holographic filter means receiving the optical means light image and producing a filtered light image correlated with an address information reference pattern, wherein said reference pattern contains correlating data on the spacing of characters in a line and on the spacing of character lines in a block;
   c. detector means receiving the holographic filter means filtered light image and producing an output electronic signal which contains the degree of correlation of said mailpiece address information to said address information reference pattern; and
   d. signal processor means receiving said detector means output electronic signal and producing an address location signal based at least in part on correlation of said mailpiece address information to said address information reference pattern.

2. The apparatus defined by claim 1 wherein said holographic filter means is a correlation filter based on an object transparency having window features set within a background, said window features being spaced from each other in lines at distances which correspond to the spacing of characters in lines in said address information reference pattern and being spaced from each other in lines in a block at distances which correspond to the spacing of character lines in a block in said address information reference pattern.

3. The apparatus defined by claim 1 wherein said address information reference pattern character spacing in lines is at a distance in the range of approximately from 10 to 12 characters per inch, and said address information reference pattern lines in a block spacing is at a distance in the range of approximately 6 to 8 lines per inch.

4. The apparatus defined by claim 1 wherein said address information reference pattern character spacing in lines is at a distance of approximately 10 characters per inch.

5. The apparatus defined by claim 1 wherein said address information reference pattern lines in a block spacing is at a distance of approximately 8 lines per inch.

6. Optical correlation systems apparatus for use in a mail sorting application and comprising:
 a. optical means which produces a light image of a mailpiece having address information comprised of characters spaced in a line and character lines spaced in a block;
 b. holographic correlation filter means receiving the optical means light image and producing a filtered light image correlated with an address information reference pattern, wherein said reference pattern contains correlating data on the spacing of characters in a line and on the spacing of characters in a line and on the spacing of character lines in a block;
 c. detector means receiving the holographic filter means filtered light image and producing an output electronic signal which contains the degree of correlation of said mailpiece address information to said address information reference pattern; and
 d. signal processor means receiving said detector means output electronic signal and producing an address location signal based at least in part on correlation of said mailpiece address information to said address information reference pattern.

7. The apparatus defined by claim 6 wherein said optical means produces a coherent light image, and wherein said holographic correlation filter means is recorded from an object transparency having address information reference pattern window features set within a background, said object transparency window features having a coherent light wavefront transmission delay that is approximately one-half wavelength greater or less than the wavefront transmission wavelength delay of said object transparency address information reference background.

8. The apparatus defined by claim 7, wherein said object transparency address information reference pattern window features are spaced from each other in lines at a distance which corresponds to a spacing of approximately 10 to 12 characters per inch in said address information reference pattern, and in lines in a block at a distance which corresponds to a spacing of approximately 6 to 8 lines per inch in said address information reference pattern.

9. The apparatus defined by claim 7 wherein said object transparency address information reference pattern window features are spaced from each other in lines at a distance which corresponds to a spacing of approximately 10 characters per inch in said address information reference pattern.

10. The apparatus defined by claim 7 wherein said object transparency address information reference pattern window features are spaced from each other in lines in a block at a distance which corresponds to a spacing of approximately 8 lines per inch in said address information reference pattern.

11. The apparatus defined by claim 6 wherein said optical means produces an incoherent light image, and wherein said holographic correlation filter means is based on an object transparency having address information reference pattern window features set within a background, said object transparency window features being relatively transparent to light and said object transparency background being relatively opaque to light.

12. The apparatus defined by claim 11 wherein said object transparency address information reference pattern window features are spaced from each other in lines at a distance which corresponds to a spacing of approximately 10 to 12 character per inch in said address information reference pattern, and in lines in a block at a distance which corresponds to a spacing of approximately 6 to 8 lines per inch in said address information reference pattern.

13. The apparatus defined by claim 11 wherein said object transparency address information reference pattern window features are spaced from each other in lines at a distance which corresponds to a spacing of approximately 10 characters per inch in said address information reference pattern.

14. The apparatus defined by claim 11 wherein said object transparency address information reference pattern window features are spaced from each other in lines in a block at a distance which corresponding to a spacing of approximately 8 lines per inch in address information reference pattern.

15. Multi-channel apparatus for use in a mail sorting system to develop address location information, comprising:
 a. optical means producing light images of a mailpiece having address information comprised of characters spaced in a line and character lines spaced in a block,
 b. multiple holographic correlation filter means each receiving an optical means light image and producing a different filtered light image correlated to a different address information reference pattern, wherein said reference pattern contains correlating data on the spacing of characters in a line and on the spacing of characters lines in a block;
 c. multiple detector means each receiving a different holographic correlation filter means filtered light image and producing an output electronic signal which contains the degree of correlation of said mailpiece address information to said different address information reference pattern; and
 d. signal processor means receiving said multiple detector means output electronic signals and producing an address location signal based at least in part on the highest correlation of said mailpiece address information to said different address information reference character pattern spacings in lines and character line pattern spacings in blocks.

16. In a method of locating address information on the face of a mailpiece, the steps of:

a. generating an image of a mailpiece having address information comprised of characters spaced in a line and character lines spaced in a block;
b. filtering said image in a spatial filter apparatus having a holographic filter made from an object transparency pattern comprised of windows spaced in a line corresponding to said character spacing and window lines spaced in a block corresponding to said character line spacing; and
c. converting said filtered image in a detector means to a correlation signal indicative of the correlation of said mailpiece address information with said filter apparatus object transparency window pattern.

17. The method defined by claim 16 wherein said object transparency windows are spaced in lines at a distance which is proportional to an address information character spacing in lines in the range of approximately 10 to 12 characters per inch, and in window lines at a distance which is proportional to an address information character line spacing in a block in the range of approximately 6 to 8 character lines per inch.

18. The method defined by claim 17 wherein said object transparency windows are spaced in lines at a distance which is proportional to an address information character spacing in lines of approximately 10 characters per inch, and in window lines at a distance which is proportional to an address information character line spacing in a block of approximately 8 lines per inch.

19. The method defined by claim 17 wherein said object transparency windows are spaced in lines at a distance which is proportional to an address information character spacing in lines of approximately 12 characters per inch, and in window lines at a distance which is proportional to an address information character line spacing in a block of approximately 8 lines per inch.

* * * * *

UNITED STATES PATENT AND TRADEMARK OFFICE
CERTIFICATE OF CORRECTION

PATENT NO. : 4,809,340

DATED : February 28, 1989

INVENTOR(S) : Keith O. Mersereau

It is certified that error appears in the above-identified patent and that said Letters Patent is hereby corrected as shown below:

At Column 8, line 45 (Claim 1), after the word "optical" insert -- means producing a light image --.

Signed and Sealed this

Eighteenth Day of July, 1989

Attest:

DONALD J. QUIGG

Attesting Officer

Commissioner of Patents and Trademarks